(12) United States Patent
Bhattacharyya et al.

(10) Patent No.: US 8,204,623 B1
(45) Date of Patent: Jun. 19, 2012

(54) PLANNING APPROACH FOR OBSTACLE AVOIDANCE IN COMPLEX ENVIRONMENT USING ARTICULATED REDUNDANT ROBOT ARM

(75) Inventors: Rajan Bhattacharyya, Sherman Oaks, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 437 days.

(21) Appl. No.: 12/587,922

(22) Filed: Oct. 13, 2009

Related U.S. Application Data

(63) Continuation-in-part of application No. 12/378,393, filed on Feb. 13, 2009.

(51) Int. Cl.
*G06F 19/00* (2011.01)
*G05B 19/04* (2006.01)

(52) U.S. Cl. .................. 700/245; 700/1; 700/246

(58) Field of Classification Search .................. None
See application file for complete search history.

(56) References Cited

U.S. PATENT DOCUMENTS

| | | | | |
|---|---|---|---|---|
| 4,737,697 | A * | 4/1988 | Maruo et al. | 318/568.13 |
| 5,598,076 | A * | 1/1997 | Neubauer et al. | 318/568.22 |
| 6,236,906 | B1 * | 5/2001 | Muller | 700/258 |
| 6,584,379 | B1 * | 6/2003 | Mukai et al. | 700/254 |
| 7,110,859 | B2 * | 9/2006 | Shibata et al. | 700/245 |
| 7,211,978 | B2 * | 5/2007 | Chang et al. | 318/568.11 |
| 7,664,570 | B2 * | 2/2010 | Suita et al. | 700/245 |
| 7,715,946 | B2 * | 5/2010 | Watanabe et al. | 700/245 |
| 2004/0267404 | A1* | 12/2004 | Danko | 700/245 |
| 2005/0096792 | A1* | 5/2005 | Watanabe et al. | 700/245 |
| 2007/0005187 | A1* | 1/2007 | Bellanger | 700/245 |
| 2007/0142966 | A1* | 6/2007 | Mirza et al. | 700/245 |

OTHER PUBLICATIONS

B. Mel, "Connectionist robot motion planning, a neutrally-inspired approach to visually-guided reaching," Academic Press, 1990, pp. 7-65.

D. Bullock, S. Grossberg, and F.H. Guenther, "A self-organizing neural model of motor equivalent reaching and tool use by a multi-joint arm," Journal of Cognitive Neuroscience, vol. 5, pp. 408-435, 1993.

N. Srinivasa and S. Grossberg, "A self-organizing neural model for fault tolerant control of redundant robots," in Proc. of the IEEE International Joint Conference on Neural Networks, pp. 1146-1152, 2007.

A. Fazl, S. Grossberg, E. Mingolla, "View-invariant object category learning, recognition, and search: How spatial and object attention are coordinated using surface-based attentional shrouds," Journal of Vision, 6(6): 315, 315a, 2006; Technical Report CAS/CNS-TR-07-011, Apr. 2007, Cognitive Psychology, pp. 1-68.

N. Srinivasa, R. Bhattacharyya, and S. Grossberg, "A Bio-Inspired Kinematic Controller for Obsticle Avoidance during reaching tasks with redundant robots," Proceedings of the 2nd Biennial IEEE/RAS-EMBS International Conference on Biomedical Robotics and Biomechatronics, Scottsdale, Az, Oct. 19-22, 2008, pp. 7-14.

* cited by examiner

*Primary Examiner* — Khoi Tran
*Assistant Examiner* — Ian Jen
(74) *Attorney, Agent, or Firm* — Tope-McKay & Assoc.

(57) ABSTRACT

A planning approach for obstacle avoidance for a robot arm is disclosed. In particular, the invention relates to a planning approach for obstacle avoidance in complex environments for an articulated redundant robot arm which uses a set of via points surrounding an obstacle as an intermediary point between initial and target arm positions. Via points are generated using visual perception, and possible trajectories through the via points and to the target are rehearsed prior to execution of movement. The disclosed planning method solves the "local minima" problem in obstacle avoidance; a situation in which the obstacle avoidance vectors prevent the arm from making progress toward the target.

24 Claims, 10 Drawing Sheets

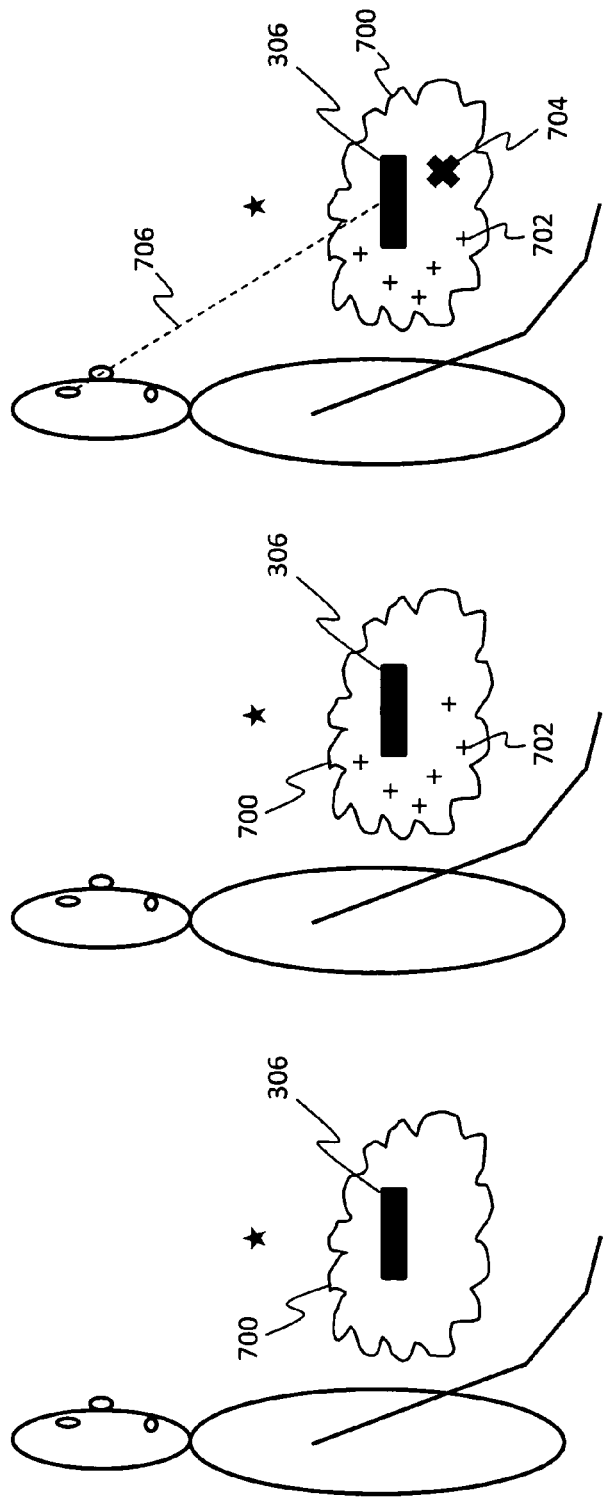

PLANNING APPROACH FOR OBSTACLE AVOIDANCE IN COMPLEX ENVIRONMENT USING ARTICULATED REDUNDANT ROBOT ARM

PRIORITY CLAIM

The present application is a continuation-in-part application, claiming the benefit of priority of U.S. patent application Ser. No. 12/378,393, filed on Feb. 13, 2009, entitled, "METHOD FOR ADAPTIVE OBSTACLE AVOIDANCE FOR ARTICULATED REDUNDANT ROBOT ARM."

BACKGROUND OF THE INVENTION (1) Field of Invention

The present invention relates to obstacle avoidance for robot arms. In particular, the invention relates to a planning approach for obstacle avoidance in complex environments for an articulated redundant robot arm which uses a set of via points surrounding an obstacle as an intermediary point between initial and target arm positions.

(2) Description of Related Art

The future of industrial robots is progressing towards systems that have a great deal of flexibility in handling various tasks in a self-organized manner and yet be safe in performing these tasks. One such task is in the area of intelligent robotic assembly. This task requires the robot to reach and grasp complex objects and manipulate them. The robot must be able to reach for any point in its workspace from any other point with varying speed requirements, while avoiding collisions with objects in the environment. The robot must be able to tolerate unexpected contingencies and perform reliably despite changes in sensor geometry and joint mobility. In order to perform these actions in a complex obstacle environment, the robot needs to be both flexible and intelligent.

Simple reactive controllers as known in the art and described in [2-4] (see List of Cited References in the Detailed Description section below) are inadequate for the abovementioned tasks. These systems lack the flexibility to deal with the unexpected contingencies of a complex and changing environment. The closest related art is described in [1]. This related art is bio-inspired and explicitly addresses the obstacle avoidance problem in complex environments. The approach in [1] performs a random exploration of arm movements "mentally" using robot models and each generated arm configuration is evaluated for its ability to bring the arm closer to target while avoiding obstacles. If none of the random movements from the present configuration are successful, then the system "backtracks" to the previous configuration and the search process is continued. The need to backtrack whenever the system reaches an impasse makes it both inefficient and impractical. Furthermore, the system in [1] is very jerky in its movement, and it is unclear as to whether movement smoothing could be applied to the system while still being able to avoid collisions.

Thus, a continuing need exists for a planning approach for obstacle avoidance for a robot arm that can generate and explore possible trajectories around obstacles before executing arm movement, and can then execute successful trajectories in a smooth and fluid manner.

SUMMARY OF INVENTION

The present invention relates to obstacle avoidance for robot arms. In particular, the invention relates to a computer-implemented planning approach for obstacle avoidance in complex environments for an articulated redundant robot arm which uses a set of via points surrounding the obstacle as an intermediary point between initial and target arm positions.

In one aspect, the invention is a computer-implemented method for obstacle avoidance in a complex obstacle environment. Possible trajectories are generated for a robot arm from an initial point to a target point. A successful trajectory is searched for among the possible trajectories, where a trajectory is determined to be successful if the robot arm reaches the target while maintaining a certain minimum distance from obstacles along the entire trajectory and within a prescribed time limit. When a successful trajectory is found, movement is executed to the target point. When a successful trajectory is not found, a set of via points are generated surrounding an obstacle using visual perception, where the obstacle is positioned such that it obstructs movement of the robot arm from the initial point to the target point, each via point being an intermediary point in a path of movement of the robot arm from the initial point to the target point to circumvent the obstacle. For each via point, an arm posture of the robot arm is selected. Then, possible trajectories are generated from: each of the set of via points to the target point; the initial point to each of the set of via points; and each of the set of via points to each other of the set of via points, whereby a successful trajectory from the initial point to one or more via points and to the target can be found.

In another aspect, wherein in the act of generating a set of via points, an attention shroud is generated surrounding the obstacle using visual perception of the obstacle, and points from within the generated attention shroud are selected as via points.

In yet another aspect, wherein in the act of selecting an arm posture for each via point, each arm posture is selected from a group consisting of: a highest scoring of a set of candidate postures recalled from a learned forward model, where the candidate postures are scored based on proximity of the via point to the arm endpoint and proximity of the arm joint angles to the mean joint angles; and an unlearned computed posture.

In another aspect, the method further comprises an act of arranging the set of via points in an order prior to generating possible trajectories, the order being selected from a group consisting of a random order, and an ascending order according to the magnitude of the difference in the distance between: the via point and the initial point; and the via point and the target point.

In a further aspect, the act of generating possible trajectories more specifically comprises the following acts. Possible trajectories are generated from a via point of highest order to the target point, the via point of highest order serving as a primary via point. When a successful trajectory from the primary via point to the target point is found, possible trajectories are generated from the initial point to the primary via point. When a successful trajectory from the primary via point to the target point is not found, possible trajectories are then generated to the target point from a via point of next-highest order, the via point of next highest order serving as the new primary via point. This step is repeated until a successful trajectory to the target is found. Next, possible trajectories from the initial point to the primary via point are generated. When a successful trajectory from the initial point to the primary via point is found, movement is executed from the initial point to the primary via point and then to the target. When a successful trajectory from the initial point to the primary via point is not found, another via point is selected to act as an intermediary via point and possible trajectories are generated from the intermediary via point to the primary via point. When a successful trajectory from the intermediary via point to the primary via point is found, movement is executed from the initial point to the intermediary via point to the primary via point and then to the target. When a successful trajectory from the intermediary via point to the primary via point is not found, another intermediary via point is selected and possible trajectories are generated from the intermediary via point to the primary via point. This process is repeated until a successful trajectory from an intermediary via point to the primary via point is found. Then, movement is executed from the initial point to the intermediary via point to the primary via point and then to the target. Finally, when all intermediary via points have been exhausted, the process is restarted from the act of generating a set of via points, by generating a new set of via points.

As can be appreciated by one skilled in the art, the present invention also comprises a data processing system comprising one or more processors configured to perform operations in accordance with the method of the present invention, as disclosed above.

Finally, as can be appreciated by one skilled in the art, the present invention comprises a computer program product, the computer program product comprising computer-readable instruction means stored on a computer-readable medium that are executable by a computer having a processor for causing the processor to perform operations in accordance with the method of the present invention, as disclosed above.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is an illustration showing an attention shroud surrounding an obstacle;

FIG. 7B is an illustration showing via points generated within an attention shroud surrounding an obstacle;

FIG. 7C is an illustration showing a via point lying in the attention shroud but obstructed from the robot's field of view;

DETAILED DESCRIPTION

Figure 1:
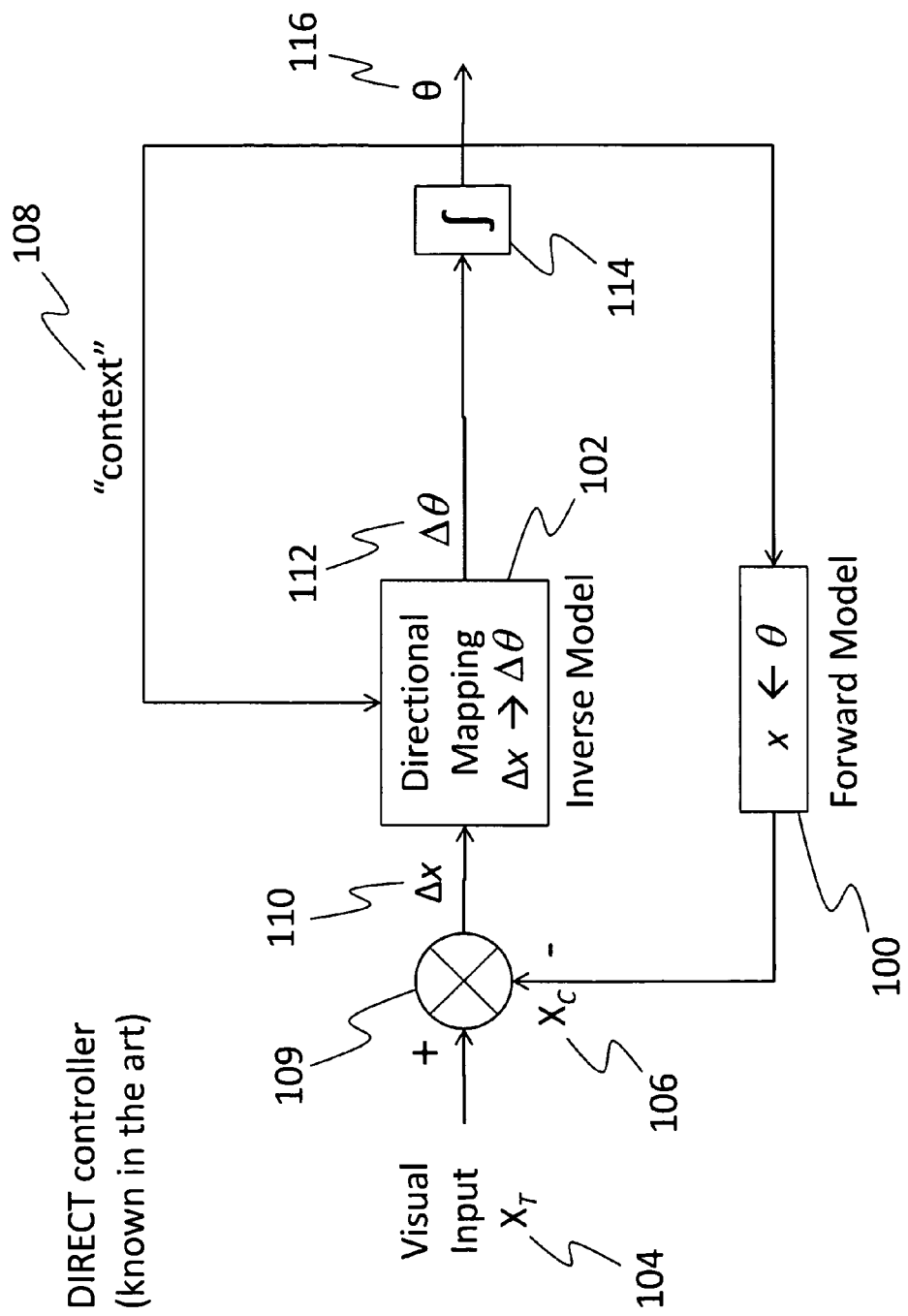
FIG. 1 is a diagram showing a robot controller in accordance with the DIRECT model, as known in the art.

The present invention relates to obstacle avoidance for robot arms. In particular, the invention relates to a planning approach for obstacle avoidance in complex environments for an articulated redundant robot arm which uses a set of via points surrounding the obstacle as an intermediary point between initial and target arm positions. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(3) List of Cited References

The following references are cited throughout this application. For clarity and convenience, the references are listed herein as a central resource for the reader.

The following references are hereby incorporated by reference as though fully included herein. The references are cited in the application by referring to the corresponding literature reference number.

1. B. Mel, "Connectionist robot motion planning: a neurally-inspired approach to visually-guided reaching" *Academic Press*, 1990.

2. D. Bullock, S. Grossberg, and F. H. Guenther, "A Self-Organizing Neural Model of Motor Equivalent Reaching and Tool Use by a Multi joint Arm," *Journal of Cognitive Neuroscience*, vol. 5, pp. 408-435, 1993.
3. N. Srinivasa and S. Grossberg, "A Self-Organizing Neural Model for Fault Tolerant Control of Redundant Robots," in *Proc. of the IEEE International Joint Conference on Neural Networks*, pp. 1146-1152, 2007.
4. R. Bhattacharyya and N. Srinivasa, "Adaptive Obstacle Avoidance for Articulated Redundant Robots," HRL Invention disclosure, December 2007.
5. Fazl, A., Grossberg, S., & Mingolla, E. (2006). View-invariant object category learning: How spatial and object attention are coordinated using surface-based attention shrouds [Abstract]. *Journal of Vision*, 6(6):315, 315a, http://journalofvision.org/6/6/315/, doi:10.1167/6.6.315.

(2) Introduction

The present invention relates to obstacle avoidance for robot arms. In particular, the invention relates to a planning approach for obstacle avoidance in complex environments for an articulated redundant robot arm which uses a set of via points surrounding the obstacle as an intermediary point between initial and target arm positions.

The invention is described as follows. First, the reactive controller model for obstacle avoidance that is used to drive the possible trajectory generation process is provided in section 3, below. The limitation of using this controller in more complex obstacle and target configurations is motivated with an example of local minima situation is provided in section 4. In section 5, the present invention which overcomes the local minima problem through planning is described.

(3) Reactive Control Model for Reaching with Obstacles

A control model was previously designed by the inventors as a reactive controller capable of obstacle avoidance in simple obstacle environments, see [4]. This control model is also detailed in U.S. patent application Ser. No. 12/378,393, filed on Feb. 13, 2009, entitled, "METHOD FOR ADAPTIVE OBSTACLE AVOIDANCE FOR ARTICULATED REDUNDANT ROBOT ARM," incorporated by reference as though fully disclosed herein. This reactive control model is an improvement to the "Direction-to-Rotation Transform" (DIRECT) control model, which is known in the art and described in [2 and 3]. FIG. 1 is a flow diagram showing a robot controller in accordance with the DIRECT method. The DIRECT method depends on construction of two different models, a forward model 100, and an inverse model 102. The forward model 100 maps joint angles to corresponding arm locations. The inverse model 102 maps changes in arm locations to changes in joint angles. The forward and inverse models are developed during a "babbling" learning phase in which the robot makes a series of small random movements and observes the resulting change in arm position corresponding to each movement. As babbling continues, the learning process gradually refines the forward and inverse models. The equations describing the learning process are outlined in [2 and 3]. The learning phase is generally performed in obstacle-free space. The DIRECT controller receives visual input 104 regarding the location of a target ($X_T$) in space. The controller obtains the current position of the arm end-effector ($X_C$) 106 from the current joint angles or "context" 108, using the forward model 100. The system then calculates 109 the necessary change in end-effector location ($\Delta x$) 110 required to reach the target. The inverse model 102 provides the changes in joint angles ($\Delta\theta$) 112 necessary to achieve the required change in end-effector location 110. The calculated joint angle change 112 is then integrated 114 with the current joint angles to produce the new posture ($\theta$) 116 of the arm. The new posture provides the "context" 108 for the next movement. This process can be repeated until the target is reached, or until some other termination criterion is fulfilled.

Figure 2:
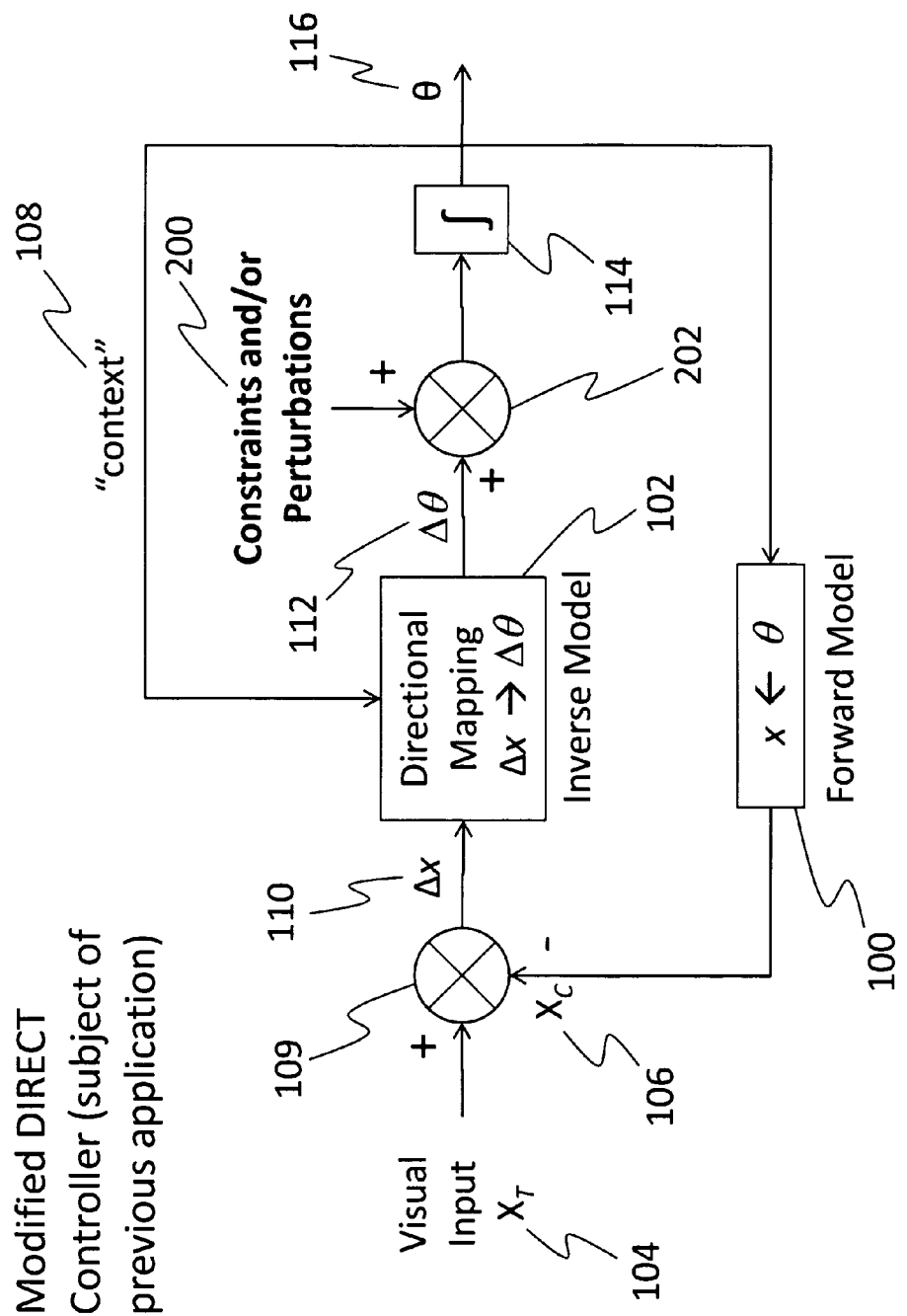
FIG. 2 is a diagram showing a robot controller in accordance with a modified DIRECT model, as disclosed in the parent application.

FIG. 2 is a flow diagram showing a modified DIRECT robot controller as disclosed in [4], and in U.S. patent application Ser. No. 12/378,393, filed on Feb. 13, 2009, entitled, "METHOD FOR ADAPTIVE OBSTACLE AVOIDANCE FOR ARTICULATED REDUNDANT ROBOT ARM." This modified DIRECT controller introduces object constraints 200 which can represent a variety of factors. In particular, the method addresses constraints derived from obstacles in the operating environment. The system calculates constraints 200 based on perceived obstacles in the environment, and combines 202 those constraints with the changes in joint angles 112 derived from the inverse model 102. The resulting joint angle changes are then integrated 114 to produce a new arm posture 116. This process can be repeated until the target is reached, or until some other termination criterion is fulfilled. A drawback to this reactive controller is that it cannot avoid collisions with obstacles in more complex obstacle configurations such as the local minima configuration as explained in the next section.

(4) Local Minima Problem

Figure 3:
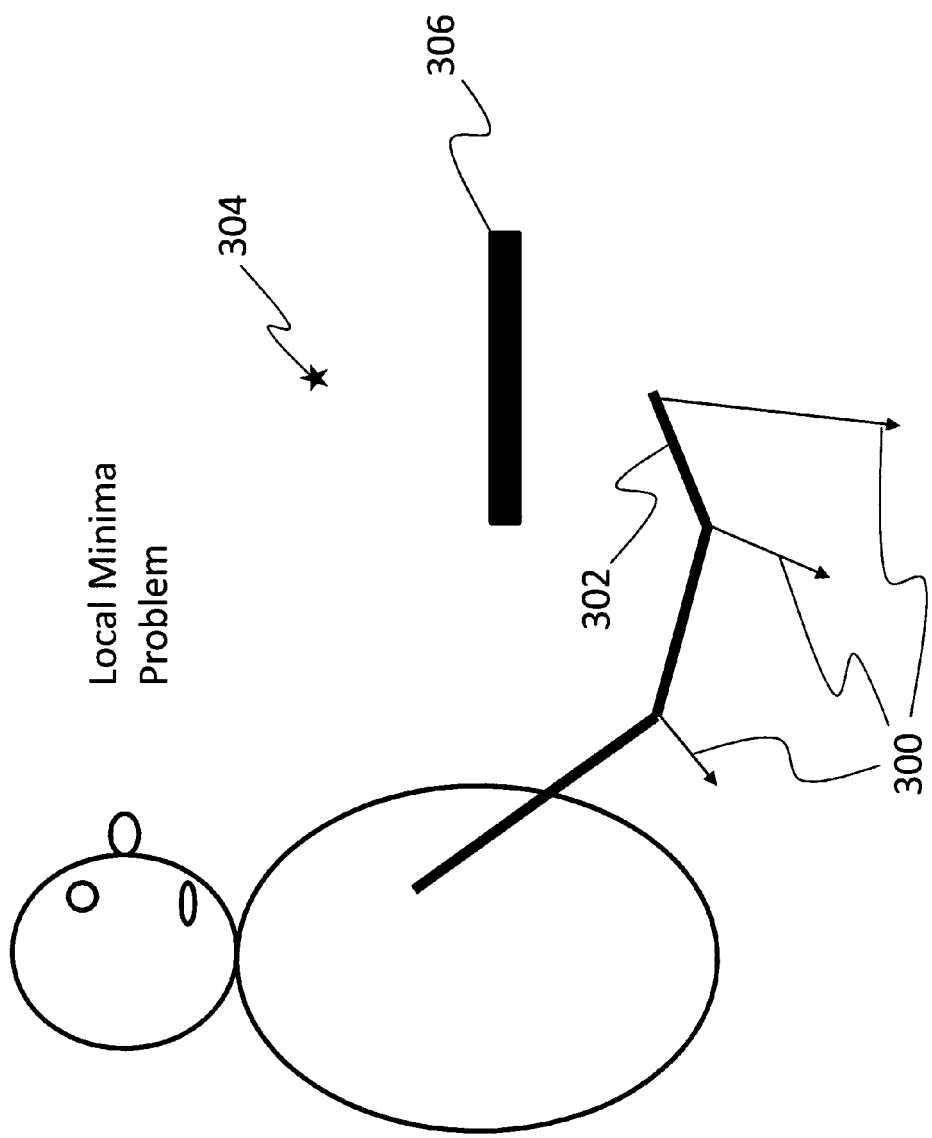
FIG. 3 is an illustration showing the local minima problem sometimes encountered by the modified DIRECT controller model.

DIRECT with adaptive obstacle avoidance for articulated redundant robots applies what can be considered to be reactive obstacle avoidance for robot control. Obstacle avoidance vectors are applied to the limbs of the robot to influence the changes in joint angle directly and independently for each limb. The obstacle avoidance vectors are formed from the configuration of obstacles in the environment and the positions of the limbs. Consequently, certain configurations of obstacles in the environment create obstacle avoidance vectors which prevent the robot from reaching the target. This situation can occur within the presence of a clear path to the target around an obstacle. The analogous term from the potential field method in kinematic control for this situation is a local minimum. FIG. 3 illustrates a local minimum situation, with the limb obstacle avoidance vectors displayed as arrows extending from the endpoints of the three limbs in the robot arm 302. As can be seen, the path to the target 304 from the robot arm 302 would require a circuitous route around the obstacle 306. The obstacle avoidance vector for the endpoint of the arm 302 directly opposes the direction the arm 302 must travel to reach the target 304. Though a clear path around the obstacle 306 exists, the application of such obstacle avoidance is a purely reactive implementation that is similar to a local minimum in the classic potential field methodology. Thus, the arm is left in a local minimum where it is driven to the target precisely in the direction it must avoid.

Figure 4:
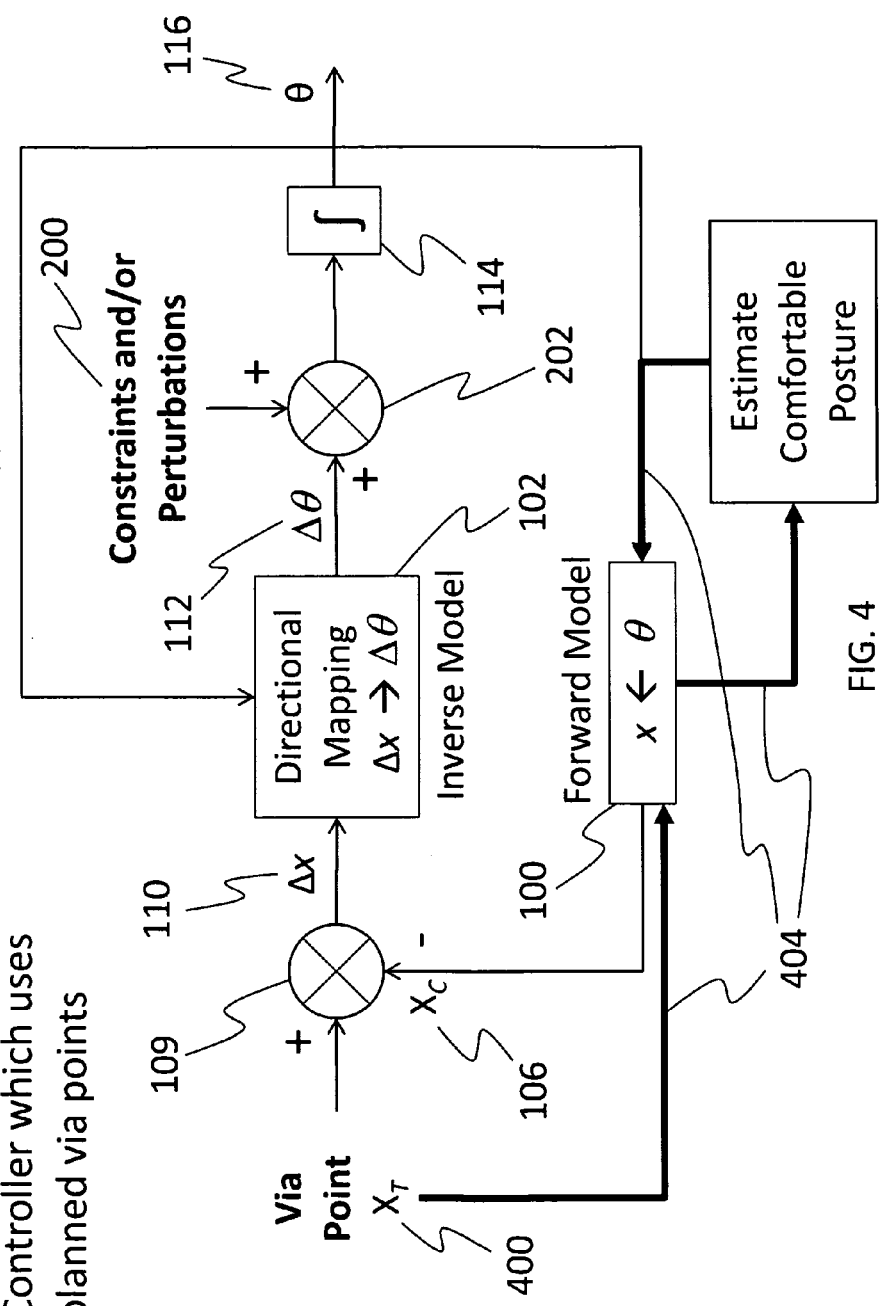
FIG. 4 is a diagram showing a modified DIRECT controller in accordance with the present invention, which uses planned via points to avoid local minima.

(5) Present Invention—Modified Direct Model for Reaching Obstacles with Planning In order to get around the obstacle, a process which actively plans trajectories must be implemented. Humans think and imagine movements before executing them in a complex environment. In accord, we have mental rehearsals of movements using the DIRECT controller with adaptive obstacle avoidance [4] to simulate different trajectories that will allow us to escape local minima. The initial training process is exactly identical to the process in [4] where the robot arm babbles in space to learn forward and inverse models of kinematic control. The perceptual influence of local obstacles introduces constraints for limb movements in a manner that can help avoid obstacles in simple configurations as shown in FIG. 3. FIG. 4 shows a modified DIRECT controller in accordance with the method of the present invention. Here, the controller is provided new perceptual information in the form of via points 400 around obstacles in its environment. These via points 400 are then used by the controller to generate possible trajectories from the initial point to the target using the forward model 100 and identifies whether this movement is successful. Also, since the robot is redundant, this model provides more than one possible posture to reach the via point. The most comfortable posture 402 is estimated and then is feedback into the control loop of the DIRECT controller with obstacle avoidance to mentally enact the posture and then use that as the starting point to further check if both the target and the initial point can be reached from that posture. The pathway with the bolded arrows 404 represents the new modifications to the DIRECT controller.

Figure 5:
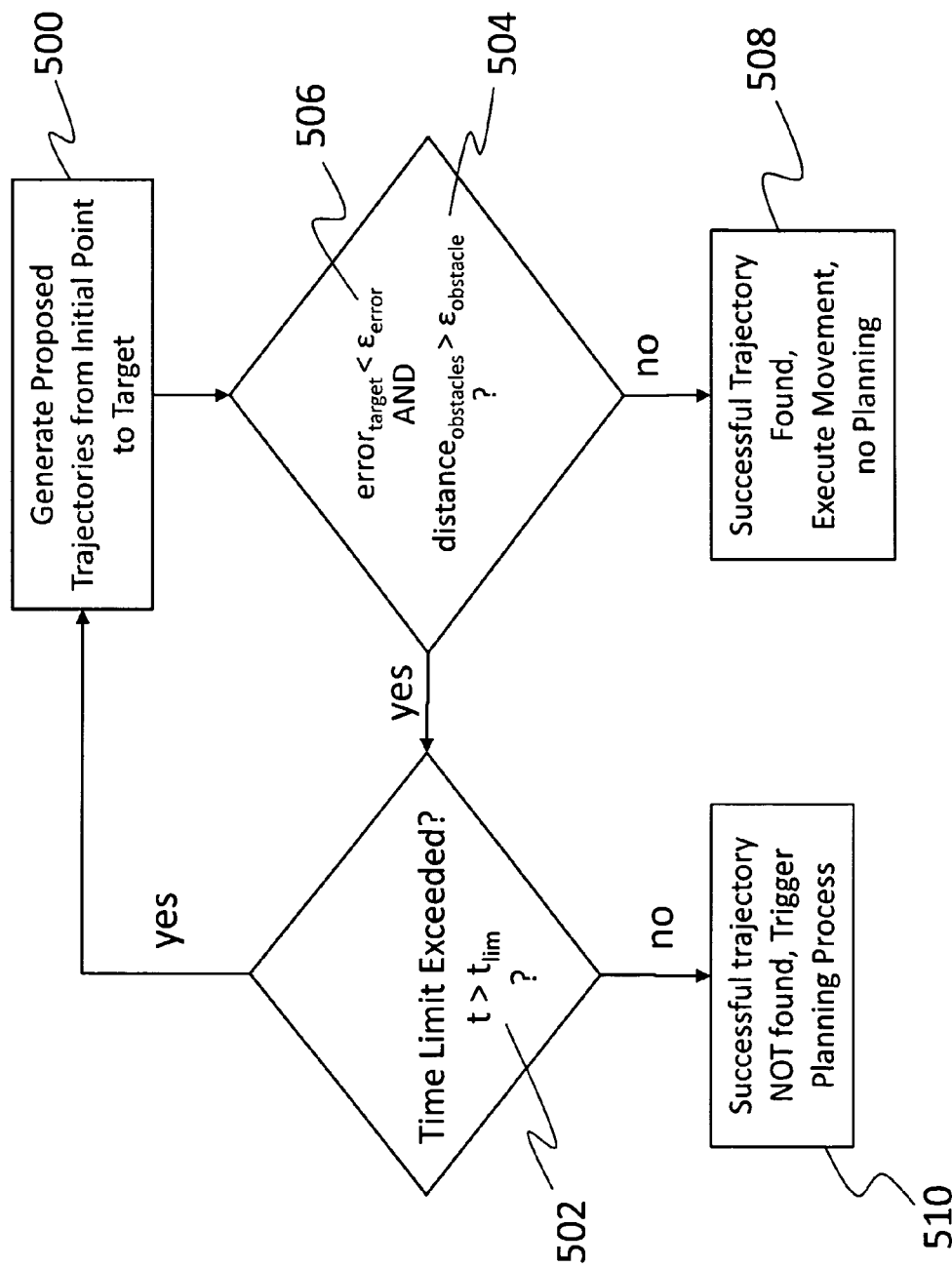
FIG. 5 is a diagram showing an overview of the acts involved in triggering the planning process of the present invention.

FIG. 5 is a flow diagram illustrating the acts required to trigger planning process of the present invention. Possible trajectories are for movement of the arm from the initial point to the target 500. The duration for the possible trajectory rehearsal is prescribed as $t_{lim}$ 502. If the robot can reach the target while maintaining a certain minimum distance from obstacles, distance$_{obstacles}$ 504 along the entire path, reach within a prescribed margin of error 506, and within the prescribed time $t_{lim}$ 502, the possible trajectory is successful, and is selected for movement execution 508. If these conditions are not met, the trigger for planning 510 is set.

Movement plans to escape local minima require paths around the obstacles. To generate these paths, we use DIRECT with adaptive obstacle avoidance to generate paths to intermediate targets, or via points, and paths from the initial point to via points. The planning process is illustrated diagrammatically in FIG. 6. The first stage is to generate possible trajectories from the initial point to the target as described above and in FIG. 5, which may trigger planning. If planning is necessary, the planning process consists principally of: (1) generating possible trajectories from via points to the target; and (2) generating possible trajectories from the initial point to via points. Once an entire successful path from the initial point to the target using via points has been rehearsed using the generated possible trajectories, it is selected and used for movement execution.

Figure 6:
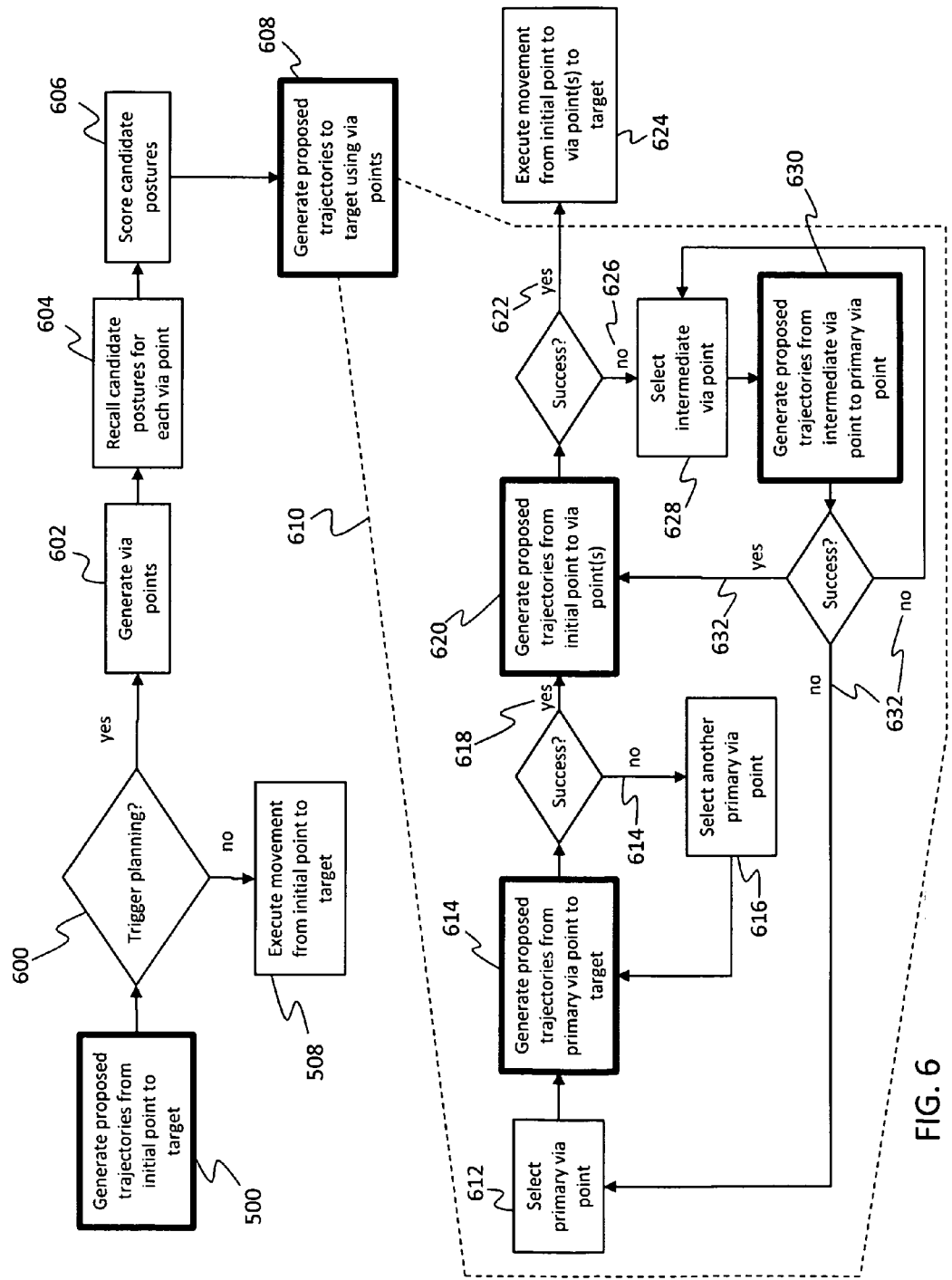
FIG. 6 is a diagram showing the detailed planning process for obstacle avoidance in accordance with the present invention.

FIG. 6 is a flow diagram showing the detailed acts in the planning process. First, possible trajectories from the initial point to the target are generated 500 using the process detailed in FIG. 5. If a successful trajectory is found, then movement from the initial point to the target is executed 508. Referring back to FIG. 6, in a case where planning is triggered 600, then the system undergoes a cascade of processes using visual perception to generate via points and candidate arm postures. First, a set of via points is generated 602 by any method known in the art, including but not limited to generating an attention shroud surrounding the obstacle using visual perception of the obstacle, and selecting points from within the shroud as via points. Next, for each via point, a set of candidate postures is generated; the set of candidate postures either being postures recalled 604 from a learned forward model, or unlearned computed postures. The postures are then scored 606 based on two criteria: (1) proximity of the via point to the arm endpoint; and (2) proximity of the arm joint angles to the mean joint angles. In a desired embodiment, the postures are tested in order of decreasing score, beginning with the highest scoring posture.

Once a set of via points and candidate arm postures has been generated, possible trajectories to the target using the via points are generated 608. The act of generating possible trajectories 608 using via points involves another cascade of processes, as shown in the lower half of FIG. 6 within the dotted box 610. The acts within box 610 are sub-acts which make up the overall act of generating possible trajectories 608 using via points. In this set of sub-acts 610, the system selects a primary via point 612. Possible trajectories from the primary via point to the target are generated 614. If a successful trajectory from the primary via point to the target cannot be found 616, then another primary via point is selected 618 and tested until a successful primary via point is found. When a successful primary via point is found 618, then possible trajectories are generated from the initial point to the primary via point. If a successful trajectory from the initial point to the primary via point is found 622, then movement from the initial point to the primary via point and to the target is executed 624. If a successful trajectory is not found 626, then an intermediate via point is selected 628, the intermediate point serving to create a route from the initial point to the primary via point. Next, possible trajectories from the intermediate via point to the primary via point are generated 630. If a successful trajectory is found 632, then possible trajectories from the initial point to the intermediate via point are generated 620, and the process continues from there as previously described. If a successful trajectory from the intermediate via point to the initial via point is not found 634, then another intermediate via point can be selected 628 or, alternatively, another primary via point can be selected 612. In either case, the process continues until a successful trajectory to the target is found, until all via points are exhausted, or until a prescribed time limit has elapsed.

The generation of via points relies on visual perception of the environment and objects within it. The present invention treats obstacles as salient elements in addition to the target in the visual scene. It has been hypothesized that such elements receive a large share of the cognitive processing during perception, and in spatial terms these elements can be said to have an attention shroud [5]. An attention shroud in essence intensifies the visual and cognitive processes in locations in the world, most probably represented in world coordinates. We use this concept to prescribe attention shrouds 700 about obstacles 306, illustrated in FIG. 7A. The increased visual attention produces an enhanced spatial perception of the localized area, and may cause the robot to actively model the obstacle and it's unseen or occluded volume, or recall the obstacle volume from memory. The obstacle volume model, or recalled model, allows the robot to then generate points in the space around the obstacle model. These points serve as via points 702 for the robot, and are depicted in FIG. 7B. They represent locations near the obstacle 306 that may provide a path around it. Some via points 702 are directly accessible to visual perception, however others may implicitly rely on the model, or recalled model of the obstacle, and place points in areas that are occluded from the robot's view, as illustrated in FIG. 7C, where the via point marked with an "x" 704 is occluded from the robot's view 706 by the obstacle 306.

The forward and inverse models are learned during the babbling process using the same training procedure and equations as described in [2-4]. The via points generated from the attention shrouds have many associated postures, or joint configurations, that place the arm near the via point. FIGS. 8B-F shows each via point and the postures that are associated with it. The postures that are recalled must be checked for placing the arm close to or within the volume of an obstacle. The remaining postures serve as candidates for each via point. In a desired aspect of the present invention, a single posture is selected to test from all the candidates for a via point in the planning process. However, it is possible to test more than one candidate posture during planning. A non-limiting example of a selection criterion is shown below, where each candidate posture is scored according to 2 metrics:

1) comfort of the arm in joint space, defined by the equation:

$$score_{comfort} = \sum_{i=1}^{m} (\theta_i - \mu_i)^2$$

where:
$score_{comfort}$ is the comfort score for a certain arm posture;
θ is the joint angle; and
μ is a parameter defining a value of the joint angle, in this non-limiting case being the center of the range of possible values for the joint angle; and 2) distance of the arm's endpoint when realizing the candidate posture from the via point, the distance defined by the equation:

$$v_i = x_{via\,point} - x_{posture}, y_{via\,point} - y_{posture},$$

where:
$v_i$ is the distance of the arm's endpoint from the via point;
$x_{via\,point} - x_{posture}$ is the distance in the x direction of the arm's endpoint from the via point; and
$y_{via\,point} - y_{posture}$ is the distance in the x direction of the arm's endpoint from the via point. The computation of distance depends on the dimensionality of the task space.

These above metrics are combined to form an overall posture score defined by the equation:

$$score = \frac{1}{(score_{comfort} * \|v_1\|)}$$

where:
score is the overall score for the candidate posture; and
∥x∥ is the magnitude of x.

Each candidate posture is scored by the above equation. The candidate posture with the highest score is selected for a given via point is subsequent trajectory rehearsals during planning. The next step in the planning process is to mentally rehearse paths using the candidate postures from the via points. It is possible to test the paths in a random order; however, a heuristic can reduce the number of tests necessary to realize a successful path on average. A non-limiting example of a heuristic that can be used to order rehearsal of possible trajectories is given by the equation:

$$|(\|\vec{v}_{via\,point\,to\,target}\| - \|\vec{v}_{via\,point\,to\,initial\,point}\|)|,$$

Where:
$\vec{v}_{via\,point\,to\,target}$ is a vector from the via point to the target;
$\vec{v}_{via\,point\,to\,initial\,point}$ is a vector from the via point to the initial point; and
∥x∥ is the magnitude of x.

According to the above heuristic, via points are ordered in ascension according to the difference in their distance from the initial point and the distance from the target. In other words, via points that are "in between" the initial point and target are selected for earlier testing. Via points and candidate postures are numbered according to this heuristic. Note that these distances are Euclidean and do not consider obstacles. A scheme that considers the distance to circumvent the obstacle, or other factors, may provide a more efficient heuristic for ordering and reduce the number of trajectory rehearsals further. The selected posture for a via point actually serves as the via point for the subsequent possible trajectory rehearsals.

That is to say, the rehearsals use the posture (joint angles), and hence the arm's endpoint is placed at a location in space corresponding to each via point. These arm postures will be referred to henceforth as posture via points for simplicity.

Once a final movement plan is selected, the robot is ready to execute the movement. The final movement is the product of two or more stages of planning: movement from the initial point to the via point, optionally movement from one via point to another via point if multiple via points are selected, and movement from the via point(s) to the target. It is possible to execute the planned movements from initial point to via point(s), and from via point(s) to the target as separate discrete movements. The DIRECT model employs a form of velocity control that models motivation from the basal ganglia, and includes a factor based on the distance to a target for a given movement. This method produces Gaussian velocity curves for joint angles that are parsimonious with those observed from humans during reaching, and is represented by the function defined below:

$$G0 = f(\vec{v}_{target}, t, G_0) = G_0 \times \|\vec{v}_{target}\| \times \left(\frac{t^2}{1+t^2}\right);$$

where: $G_0$, is a parameter set by the user, $\vec{v}_{target}$ is the vector from the end effector to the target, and t is the elapsed time from the beginning of the movement.

In the present invention, we have chosen to produce a single, continuous movement from the initial point to the target, without the need for stopping at via points. This requires a modification of the velocity control term described above, and a switching from the via point to the target by the controller during the movement. The modified velocity control equation is give below:

$$G0_{switch} = f(d_1, d_2, t, G_0) =$$
$$[(a(d_1) \times d_1) + (a_{0\_}a(d_1) \times d_2)] \times G_0 \times \left(\frac{t^2}{1+t^2}\right);$$

where:
$d_1 = \|\vec{v}_{via\,point}\|$,
$d_2 = \|\vec{v}_{target}\|$,
α is a function of distance, in this case a linear saturating function (though other functions can be used). $G_0$ is a parameter set by the user, $\vec{v}_{target}$ is the vector from the end effector to the target, $\vec{v}_{via\,point}$ is the distance from the end effector to the via point, and t is the elapsed time from the beginning of the movement.

Figure 8A:
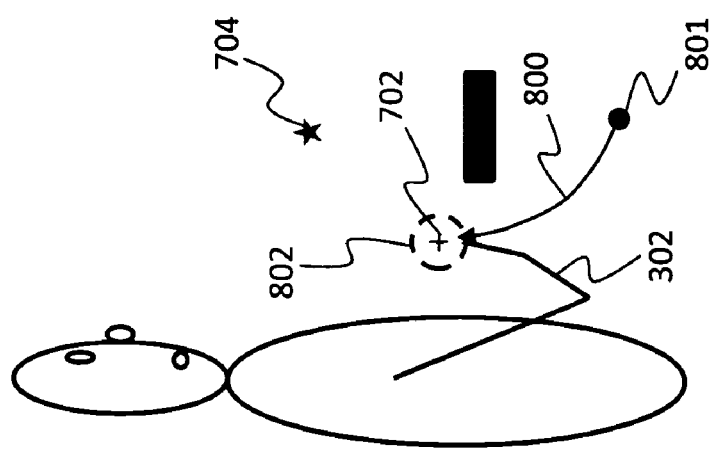
FIG. 8A is an illustration showing the trajectory of a robot arm from an initial point to a via point.
Figure 8B:
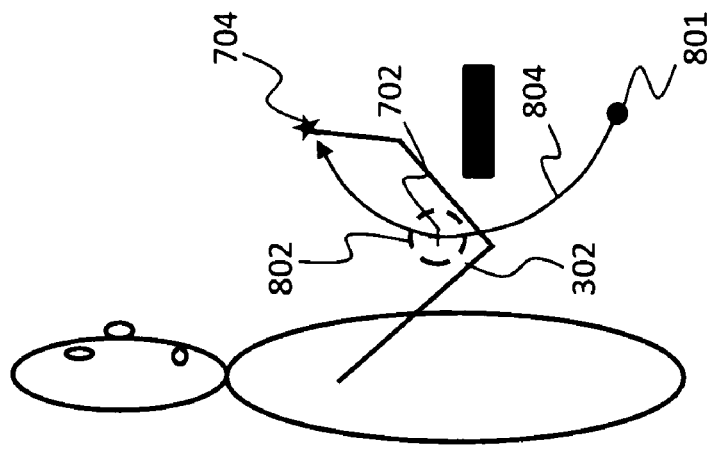
FIG. 8B is an illustration showing a complete trajectory of a robot arm from an initial point, through a via point, and to a target, where the trajectory is executed in one smooth continuous movement.

FIGS. 8A and 8B show movement execution according to the above velocity control model. FIG. 8A shows arm 302 trajectory 800 from the initial point 801 to the via point 702, with the neighborhood for target switching shown by the dashed circle 802. The complete movement execution path trajectory 804 is shown in FIG. 8B, with the arm 302 reaching from the initial point 801 through the via point 702 and to the target 704 in one continuous motion.

Figure 9:
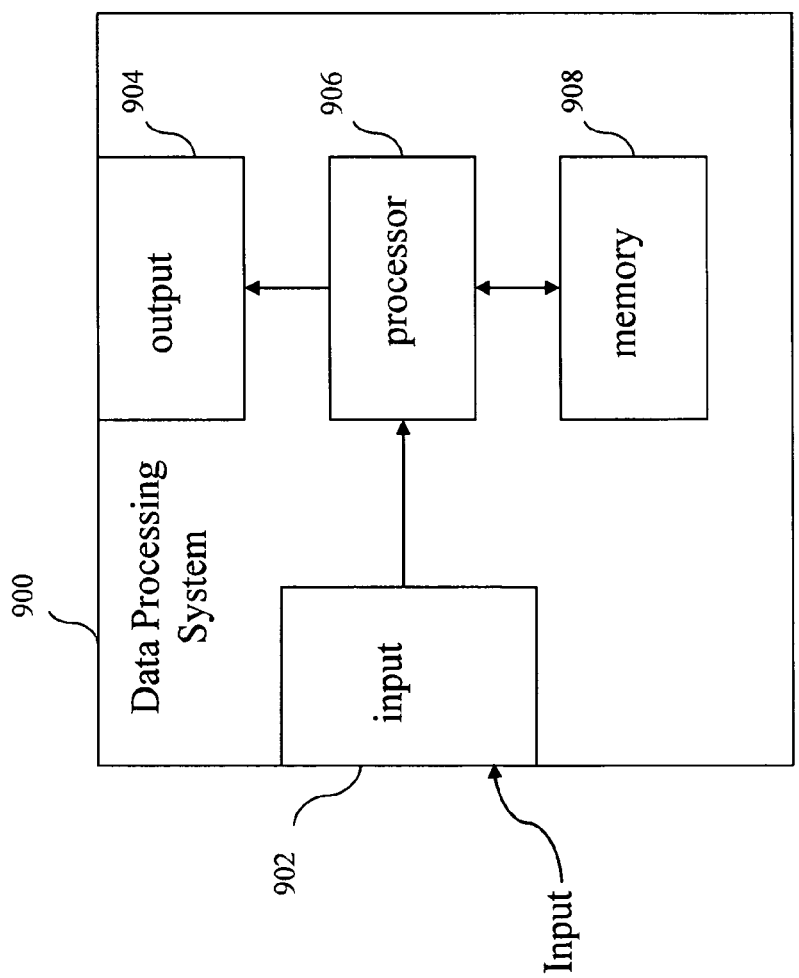
FIG. 9 is a block diagram showing a data processing system for use with the present invention.

A block diagram depicting the components of a data processing system for use with the present invention is provided in FIG. 9. The data processing system 900 comprises an input 902 for receiving visual perception information regarding objects in the task-space, as well as information regarding the limitations of the robot being used. Note that the input 902 may include multiple "ports." Typically, input is received from at least one sensor, non-limiting examples of which include video image sensors. An output 904 is connected with the processor for generating possible trajectories and processing other acts in the method of the present invention. Output may also be provided to other devices or other programs; e.g., to other software modules, for use therein. The input 902 and the output 904 are both coupled with a processor 906, which may be a general-purpose computer processor or a specialized processor designed specifically for use with the present invention. The processor 906 is coupled with a memory 908 to permit storage of data and software that are to be manipulated by commands to the processor 906.

Figure 10:
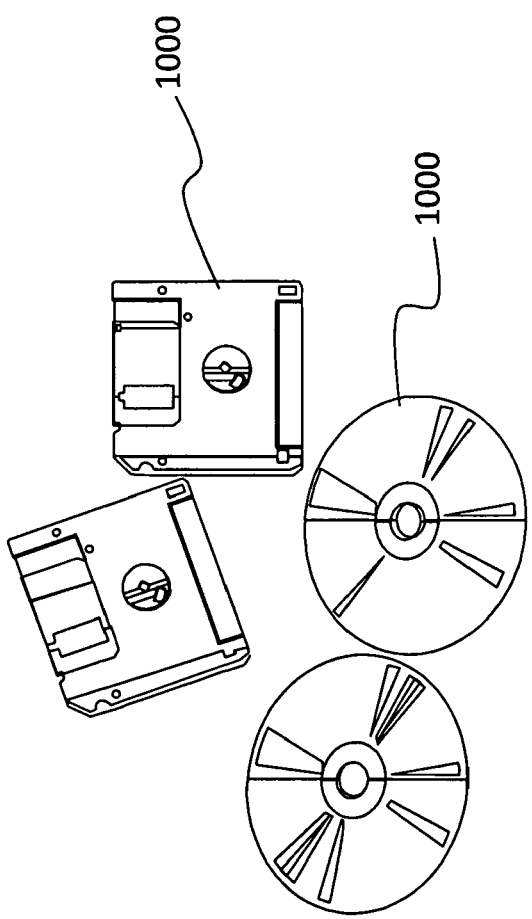
FIG. 10 is an illustration showing examples of computer program products in accordance with the present invention.

An illustrative diagram of a computer program product embodying the present invention is depicted in FIG. 10. The computer program product 1000 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

What is claimed is:

1. A computer implemented method for planning a path by a processor to reach a target in a complex obstacle environment using an articulated redundant robot arm, comprising:
   generating possible trajectories for the robot arm from an initial point to a target point;
   searching for a successful trajectory among the possible trajectories, where a trajectory is determined to be successful if the robot arm reaches the target while maintaining a certain minimum distance from obstacles along the entire trajectory and within a prescribed time limit;
   when a successful trajectory is found, executing movement to the target point;
   when a successful trajectory is not found;
      generating a set of via points surrounding an obstacle using visual perception, each via point being an intermediary point in a path of movement of the robot arm from the initial point to the target point;
      selecting an arm posture of the robot arm when positioned at each via point;
      generating possible trajectories from:
         each of the set of via points to the target point;
         the initial point to each of the set of via points; and
         each of the set of via points to each of the other set of via points; whereby a successful trajectory from the initial point to one or more via points and to the target is found.

2. The method of claim 1, where in the act of generating a set of via points, an attention shroud is generated surrounding the obstacle using visual perception of the obstacle, and points from within the generated attention shroud are selected as via points.

3. The method of claim 2, where in the act of selecting an arm posture for each via point, each arm posture is selected from a group consisting of:
   a highest scoring of a set of candidate postures recalled from a learned forward model, where the candidate postures are scored based on proximity of the via point to the arm endpoint and proximity of the arm joint angles to the mean joint angles; and
   an unlearned computed posture.

4. The method of claim 3, further comprising an act of arranging the set of via points in an order prior to generating possible trajectories, the order being selected from a group consisting of:
   a random order; and
   an ascending order according to the magnitude of the difference in the distance between: the via point and the initial point; and the via point and the target point.

5. The method of claim 4, wherein the act of generating possible trajectories more specifically comprises acts of:
   generating proposed trajectories from a via point of highest order to the target, the via point of highest order serving as a primary via point;
   when a successful trajectory from the primary via point to the target point is found, generating possible trajectories from the initial point to the primary via point;
   when a successful trajectory from the primary via point to the target point is not found, generating possible trajectories from the via point of next-highest order to the target point, the via point of next highest order serving as the new primary via point, repeating this step until a successful trajectory to the target point is found, and then generating possible trajectories from the initial point to the primary via point;
   when a successful trajectory from the initial point to the primary via point is found, executing movement from the initial point to the primary via point and then to the target;
   when a successful trajectory from the initial point to the primary via point is not found:
      selecting another via point to act as an intermediary via point and generating possible trajectories from the intermediary via point to the primary via point;
      when a successful trajectory from the intermediary via point to the primary via point is found, generating possible trajectories from the initial point to the intermediary via point;
         when a successful trajectory from the initial point to the intermediary via point is found, executing movement from the initial point to the intermediary via point to the primary via point and then to the target;
         when a successful trajectory from the initial point to the intermediary via point is not found, selecting another intermediary via point and repeating the process from the act of generating possible trajectories from the intermediary via point to the primary via point;
      when a successful trajectory from the intermediary via point to the primary via point is not found, selecting another intermediary via point and generating possible trajectories from the intermediary via point to the primary via point, repeating this process until a successful trajectory from an intermediary via point to the primary via point is found, and then executing movement from the initial point to the intermediary via point to the primary via point and then to the target; and
   when all intermediary via points have been exhausted, restarting the process from the act of generating a set of via points, by generating a new set of via points.

6. The method of claim 1, where in the act of selecting an arm posture for each via point, each arm posture is selected from a group consisting of:
- a highest scoring of a set of candidate postures recalled from a learned forward model, where the candidate postures are scored based on proximity of the via point to the arm endpoint and proximity of the arm joint angles to the mean joint angles; and
- an unlearned computed posture.

7. The method of claim 1, further comprising an act of arranging the set of via points in an order prior to generating possible trajectories, the order being selected from a group consisting of:
- a random order; and
- an ascending order according to the magnitude of the difference in the distance between: the via point and the initial point; and the via point and the target point.

8. The method of claim 1, wherein the act of generating possible trajectories more specifically comprises acts of:
- generating possible trajectories from a via point of highest order to the target, the via point of highest order serving as a primary via point;
- when a successful trajectory from the primary via point to the target point is found, generating possible trajectories from the initial point to the primary via point;
- when a successful trajectory from the primary via point to the target point is not found, generating possible trajectories from the via point of next-highest order to the target point, the via point of next highest order serving as the new primary via point, repeating this step until a successful trajectory to the target point is found, and then generating possible trajectories from the initial point to the primary via point;
- when a successful trajectory from the initial point to the primary via point is found, executing movement from the initial point to the primary via point and then to the target;
- when a successful trajectory from the initial point to the primary via point is not found:
  - selecting another via point to act as an intermediary via point and generating possible trajectories from the intermediary via point to the primary via point;
  - when a successful trajectory from the intermediary via point to the primary via point is found, generating possible trajectories from the initial point to the intermediary via point;
    - when a successful trajectory from the initial point to the intermediary via point is found, executing movement from the initial point to the intermediary via point to the primary via point and then to the target;
    - when a successful trajectory from the initial point to the intermediary via point is not found, selecting another intermediary via point and repeating the process from the act of generating possible trajectories from the intermediary via point to the primary via point;
  - when a successful trajectory from the intermediary via point to the primary via point is not found, selecting another intermediary via point and generating possible trajectories from the intermediary via point to the primary via point, repeating this process until a successful trajectory from an intermediary via point to the primary via point is found, and then executing movement from the initial point to the intermediary via point to the primary via point and then to the target; and
  - when all intermediary via points have been exhausted, restarting the process from the act of generating a set of via points, by generating a new set of via points.

9. A data processing system for planning a path by a processor to reach a target in a complex obstacle environment using an articulated redundant robot arm, comprising one or more processors configured to perform operations of:
- generating possible trajectories for the robot arm from an initial point to a target point;
- searching for a successful trajectory among the possible trajectories, where a trajectory is determined to be successful if the robot arm reaches the target while maintaining a certain minimum distance from obstacles along the entire trajectory and within a prescribed time limit;
- when a successful trajectory is found, executing movement to the target point;
- when a successful trajectory is not found;
  - generating a set of via points surrounding an obstacle using visual perception, each via point being an intermediary point in a path of movement of the robot arm from the initial point to the target point;
  - selecting an arm posture of the robot arm when positioned at each via point;
  - generating possible trajectories from:
    - each of the set of via points to the target point;
    - the initial point to each of the set of via points; and
    - each of the set of via points to each of the other set of via points; whereby a successful trajectory from the initial point to one or more via points and to the target is found.

10. The data processing system of claim 9, where in the operation of generating a set of via points, an attention shroud is generated surrounding the obstacle using visual perception of the obstacle, and points from within the generated attention shroud are selected as via points.

11. The data processing system of claim 10, where in the operation of selecting an arm posture for each via point, each arm posture is selected from a group consisting of:
- a highest scoring of a set of candidate postures recalled from a learned forward model, where the candidate postures are scored based on proximity of the via point to the arm endpoint and proximity of the arm joint angles to the mean joint angles; and
- an unlearned computed posture.

12. The data processing system of claim 11, further configured to perform an operation of arranging the set of via points in an order prior to generating possible trajectories, the order being selected from a group consisting of:
- a random order; and
- an ascending order according to the magnitude of the difference in the distance between: the via point and the initial point; and the via point and the target point.

13. The data processing system of claim 12, wherein the operation of generating possible trajectories more specifically comprises acts of:
- generating possible trajectories from a via point of highest order to the target, the via point of highest order serving as a primary via point;
- when a successful trajectory from the primary via point to the target point is found, generating possible trajectories from the initial point to the primary via point;
- when a successful trajectory from the primary via point to the target point is not found, generating possible trajectories from the via point of next-highest order to the target point, the via point of next highest order serving as the new primary via point, repeating this step until a successful trajectory to the target point is found, and then generating possible trajectories from the initial point to the primary via point;

when a successful trajectory from the initial point to the primary via point is found, executing movement from the initial point to the primary via point and then to the target;

when a successful trajectory from the initial point to the primary via point is not found:

selecting another via point to act as an intermediary via point and generating possible trajectories from the intermediary via point to the primary via point;

when a successful trajectory from the intermediary via point to the primary via point is found, generating possible trajectories from the initial point to the intermediary via point;

when a successful trajectory from the initial point to the intermediary via point is found, executing movement from the initial point to the intermediary via point to the primary via point and then to the target;

when a successful trajectory from the initial point to the intermediary via point is not found, selecting another intermediary via point and repeating the process from the act of generating possible trajectories from the intermediary via point to the primary via point;

when a successful trajectory from the intermediary via point to the primary via point is not found, selecting another intermediary via point and generating possible trajectories from the intermediary via point to the primary via point, repeating this process until a successful trajectory from an intermediary via point to the primary via point is found, and then executing movement from the initial point to the intermediary via point to the primary via point and then to the target; and when all intermediary via points have been exhausted, restarting the process from the act of generating a set of via points, by generating a new set of via points.

14. The data processing system of claim 9, where in the operation of selecting an arm posture for each via point, each arm posture is selected from a group consisting of:

a highest scoring of a set of candidate postures recalled from a learned forward model, where the candidate postures are scored based on proximity of the via point to the arm endpoint and proximity of the arm joint angles to the mean joint angles; and an unlearned computed posture.

15. The data processing system of claim 9, further configured to perform an operation of arranging the set of via points in an order prior to generating possible trajectories, the order being selected from a group consisting of:

a random order; and an ascending order according to the magnitude of the difference in the distance between: the via point and the initial point; and the via point and the target point.

16. The data processing system of claim 9, wherein the operation of generating possible trajectories more specifically comprises acts of:

generating possible trajectories from a via point of highest order to the target, the via point of highest order serving as a primary via point;

when a successful trajectory from the primary via point to the target point is found, generating possible trajectories from the initial point to the primary via point;

when a successful trajectory from the primary via point to the target point is not found, generating possible trajectories from the via point of next-highest order to the target point, the via point of next highest order serving as the new primary via point, repeating this step until a successful trajectory to the target point is found, and then generating possible trajectories from the initial point to the primary via point;

when a successful trajectory from the initial point to the primary via point is found, executing movement from the initial point to the primary via point and then to the target;

when a successful trajectory from the initial point to the primary via point is not found:

selecting another via point to act as an intermediary via point and generating possible trajectories from the intermediary via point to the primary via point;

when a successful trajectory from the intermediary via point to the primary via point is found, generating possible trajectories from the initial point to the intermediary via point;

when a successful trajectory from the initial point to the intermediary via point is found, executing movement from the initial point to the intermediary via point to the primary via point and then to the target;

when a successful trajectory from the initial point to the intermediary via point is not found, selecting another intermediary via point and repeating the process from the act of generating possible trajectories from the intermediary via point to the primary via point;

when a successful trajectory from the intermediary via point to the primary via point is not found, selecting another intermediary via point and generating possible trajectories from the intermediary via point to the primary via point, repeating this process until a successful trajectory from an intermediary via point to the primary via point is found, and then executing movement from the initial point to the intermediary via point to the primary via point and then to the target; and when all intermediary via points have been exhausted, restarting the process from the act of generating a set of via points, by generating a new set of via points.

17. A computer program product for planning a path by a processor to reach a target in a complex obstacle environment using an articulated redundant robot arm, the computer program product comprising computer-readable instruction means stored on a computer-readable medium that are executable by a computer having a processor for causing the processor to perform operations of:

generating possible trajectories for the robot arm from an initial point to a target point;

searching for a successful trajectory among the possible trajectories, where a trajectory is determined to be successful if the robot arm reaches the target while maintaining a certain minimum distance from obstacles along the entire trajectory and within a prescribed time limit;

when a successful trajectory is found, executing movement to the target point;

when a successful trajectory is not found;

generating a set of via points surrounding an obstacle using visual perception, each via point being an intermediary point in a path of movement of the robot arm from the initial point to the target point;

selecting an arm posture of the robot arm when positioned at each via point;

generating possible trajectories from:
   each of the set of via points to the target point;
   the initial point to each of the set of via points; and
   each of the set of via points to each of the other set of via points; whereby a successful trajectory from the initial point to one or more via points and to the target is found.

18. The computer program product of claim 17, where in the operation of generating a set of via points, an attention shroud is generated surrounding the obstacle using visual perception of the obstacle, and points from within the generated attention shroud are selected as via points.

19. The computer program product of claim 18, where in the operation of selecting an arm posture for each via point, each arm posture is selected from a group consisting of:
   a highest scoring of a set of candidate postures recalled from a learned forward model, where the candidate postures are scored based on proximity of the via point to the arm endpoint and proximity of the arm joint angles to the mean joint angles; and
   an unlearned computed posture.

20. The computer program product of claim 19, further configured to perform an operation of arranging the set of via points in an order prior to generating possible trajectories, the order being selected from a group consisting of:
   a random order; and
   an ascending order according to the magnitude of the difference in the distance between: the via point and the initial point; and the via point and the target point.

21. The computer program product of claim 20, wherein the operation of generating possible trajectories more specifically comprises acts of:
   generating possible trajectories from a via point of highest order to the target, the via point of highest order serving as a primary via point;
   when a successful trajectory from the primary via point to the target point is found, generating possible trajectories from the initial point to the primary via point;
   when a successful trajectory from the primary via point to the target point is not found, generating possible trajectories from the via point of next-highest order to the target point, the via point of next highest order serving as the new primary via point, repeating this step until a successful trajectory to the target point is found, and then generating possible trajectories from the initial point to the primary via point;
   when a successful trajectory from the initial point to the primary via point is found, executing movement from the initial point to the primary via point and then to the target;
   when a successful trajectory from the initial point to the primary via point is not found:
      selecting another via point to act as an intermediary via point and generating possible trajectories from the intermediary via point to the primary via point;
      when a successful trajectory from the intermediary via point to the primary via point is found, generating possible trajectories from the initial point to the intermediary via point;
         when a successful trajectory from the initial point to the intermediary via point is found, executing movement from the initial point to the intermediary via point to the primary via point and then to the target;
         when a successful trajectory from the initial point to the intermediary via point is not found, selecting another intermediary via point and repeating the process from the act of generating possible trajectories from the intermediary via point to the primary via point;
      when a successful trajectory from the intermediary via point to the primary via point is not found, selecting another intermediary via point and generating possible trajectories from the intermediary via point to the primary via point, repeating this process until a successful trajectory from an intermediary via point to the primary via point is found, and then executing movement from the initial point to the intermediary via point to the primary via point and then to the target; and
      when all intermediary via points have been exhausted, restarting the process from the act of generating a set of via points, by generating a new set of via points.

22. The computer program product of claim 17, where in the operation of selecting an arm posture for each via point, each arm posture is selected from a group consisting of:
   a highest scoring of a set of candidate postures recalled from a learned forward model, where the candidate postures are scored based on proximity of the via point to the arm endpoint and proximity of the arm joint angles to the mean joint angles; and
   an unlearned computed posture.

23. The computer program product of claim 17, further configured to perform an operation of arranging the set of via points in an order prior to generating possible trajectories, the order being selected from a group consisting of:
   a random order; and
   an ascending order according to the magnitude of the difference in the distance between: the via point and the initial point; and the via point and the target point.

24. The computer program product of claim 17, wherein the operation of generating possible trajectories more specifically comprises acts of:
   generating possible trajectories from a via point of highest order to the target, the via point of highest order serving as a primary via point;
   when a successful trajectory from the primary via point to the target point is found, generating possible trajectories from the initial point to the primary via point;
   when a successful trajectory from the primary via point to the target point is not found, generating possible trajectories from the via point of next-highest order to the target point, the via point of next highest order serving as the new primary via point, repeating this step until a successful trajectory to the target point is found, and then generating possible trajectories from the initial point to the primary via point;
   when a successful trajectory from the initial point to the primary via point is found, executing movement from the initial point to the primary via point and then to the target;
   when a successful trajectory from the initial point to the primary via point is not found:
      selecting another via point to act as an intermediary via point and generating possible trajectories from the intermediary via point to the primary via point;
      when a successful trajectory from the intermediary via point to the primary via point is found, generating possible trajectories from the initial point to the intermediary via point;
         when a successful trajectory from the initial point to the intermediary via point is found, executing movement from the initial point to the intermediary via point to the primary via point and then to the target;

when a successful trajectory from the initial point to the intermediary via point is not found, selecting another intermediary via point and repeating the process from the act of generating possible trajectories from the intermediary via point to the primary via point;

when a successful trajectory from the intermediary via point to the primary via point is not found, selecting another intermediary via point and generating possible trajectories from the intermediary via point to the primary via point, repeating this process until a successful trajectory from an intermediary via point to the primary via point is found, and then executing movement from the initial point to the intermediary via point to the primary via point and then to the target; and when all intermediary via points have been exhausted, restarting the process from the act of generating a set of via points, by generating a new set of via points.

* * * * *